(12) United States Patent
Gudimetla

(10) Patent No.: US 11,879,558 B2
(45) Date of Patent: Jan. 23, 2024

(54) HYDRAULIC PRESSURE RELIEF VALVE WITH INTEGRATED CALIBRATION MECHANISM

(71) Applicant: The Boeing Company, Chicago, IL (US)

(72) Inventor: Chandra Sudhakar Gudimetla, Karnataka (IN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/585,872

(22) Filed: Jan. 27, 2022

(65) Prior Publication Data

US 2022/0252172 A1   Aug. 11, 2022

Related U.S. Application Data

(60) Provisional application No. 63/146,233, filed on Feb. 5, 2021.

(51) Int. Cl.
  *F16K 17/06* (2006.01)
  *F16K 15/02* (2006.01)
(52) U.S. Cl.
  CPC ............ *F16K 17/06* (2013.01); *F16K 15/026* (2013.01); *Y10T 137/7929* (2015.04)
(58) Field of Classification Search
  CPC .. F16K 15/026; F16K 17/06; Y10T 137/1925; Y10T 137/7929
  USPC .......................................................... 138/44
  See application file for complete search history.

(56) References Cited

U.S. PATENT DOCUMENTS

| | | | | |
|---|---|---|---|---|
| 1,865,795 A | * | 7/1932 | Schnitter ................... | G01F 1/42 138/44 |
| 2,254,209 A | * | 9/1941 | Buttner ................. | F16K 15/026 137/540 |
| 2,320,339 A | * | 6/1943 | Buttner ................. | F16K 17/082 137/540 |
| 2,601,563 A | * | 6/1952 | Selwyn ............... | F16K 17/0433 251/336 |
| 2,666,448 A | * | 1/1954 | Garretson ................. | F16K 1/34 301/5.1 |
| 3,025,874 A | * | 3/1962 | Yocum ...................... | F16K 1/36 137/540 |
| 3,255,774 A | * | 6/1966 | Gallagher ............... | F16K 17/06 137/540 |
| 3,422,840 A | * | 1/1969 | Brumm ............... | F16K 17/0493 137/540 |

(Continued)

*Primary Examiner* — Robert K Arundale
(74) *Attorney, Agent, or Firm* — McDonnell Boehnen Hulbert & Berghoff LLP

(57) ABSTRACT

In an example, a pressure relief valve is described. The pressure relief valve comprises a housing configured to allow fluid flow therethrough. The pressure relief valve also comprises an adapter having interior threads, where the adapter is attached to the housing such that the adapter is positioned at least partially within the housing. The pressure relief valve also comprises an orifice plate having an orifice formed therein to allow fluid flow therethrough, where the orifice plate comprises exterior threads that engage with the interior threads of the adapter to couple the orifice plate to the adapter. The pressure relief valve also comprises a spring disposed within the housing. The orifice plate translates via engagement of the exterior threads with the interior threads to calibrate a spring force of the spring.

20 Claims, 4 Drawing Sheets

(56) References Cited

U.S. PATENT DOCUMENTS

| | | | | |
|---|---|---|---|---|
| 3,580,275 | A * | 5/1971 | Hanson | F16K 15/026 |
| | | | | 137/540 |
| 5,090,446 | A * | 2/1992 | Hunter | F16K 15/026 |
| | | | | 137/540 |
| 5,299,598 | A * | 4/1994 | Quartana, III | F16K 1/38 |
| | | | | 137/516.29 |
| 6,244,295 | B1 * | 6/2001 | Bartussek | F16K 15/044 |
| | | | | 137/540 |
| 8,485,213 | B2 | 7/2013 | Hawkins et al. | |
| 2003/0047216 | A1 * | 3/2003 | Kelly | F16K 17/06 |
| | | | | 137/538 |
| 2003/0172973 | A1 * | 9/2003 | Abe | F16K 15/026 |
| | | | | 137/540 |
| 2005/0199290 | A1 * | 9/2005 | Hsiao | F16K 17/30 |
| | | | | 137/517 |
| 2005/0217731 | A1 * | 10/2005 | Abe | F16K 17/06 |
| | | | | 137/540 |
| 2015/0107702 | A1 * | 4/2015 | Lu | F16K 15/026 |
| | | | | 137/540 |
| 2018/0128306 | A1 * | 5/2018 | Alaimo | F16B 39/34 |

\* cited by examiner

HYDRAULIC PRESSURE RELIEF VALVE WITH INTEGRATED CALIBRATION MECHANISM

CROSS-REFERENCE TO RELATED APPLICATIONS

The present disclosure claims priority to U.S. Provisional Application No. 63/146,233, filed on Feb. 5, 2021, the entire contents of which are herein incorporated by reference.

FIELD

The present disclosure relates generally to hydraulic pressure relief valves, and more particularly, to a hydraulic pressure relief valve with an integrated calibration mechanism.

BACKGROUND

Pressure relief valves are often found in hydraulic systems, such as a hydraulic system of the main landing gear brakes of an aircraft, and are designed to protect such systems from overpressure. A pressure relief valve is designed to open when a desired pressure level is reached and then discharge fluid as pressure continues to increase. Fluid will continue to be discharged until the pressure in the hydraulic system drops back down to the desired pressure level. To accomplish this, existing pressure relief valves often include a spring-loaded poppet valve and a spring. The poppet valve remains closed until the desired pressure level is reached, at which point the spring force is exceeded and the poppet valve opens to release fluid. Release of the fluid is often controlled in existing pressure relief valves using a flow restrictor that is installed at the outlet of the pressure relief valve.

Existing pressure relief valves often use a method of shimming to adjust the spring force to correspond to the desired pressure level. In particular, an existing pressure relief valve is at least partially disassembled to allow access to an interior of the valve. Shims are then added and/or removed through trial and error until a desired spring force is achieved, after which the existing pressure relief valve is then reassembled. However, the disassembly and reassembly of the existing pressure relief valve, along with the trial and error nature of the shimming method, can make the spring force calibration process more time consuming and expensive than desired, and can require the use of more tools, shims, and/or other resources than desired. In addition, specific quantities and sizes of shims might be required to finely tune the spring force, and in some scenarios, such quantities and sizes might not be available.

What is needed is a less complex pressure relief valve that can be more efficiently calibrated.

SUMMARY

In an example, a pressure relief valve is described. The pressure relief valve comprises a housing configured to allow fluid flow therethrough. The pressure relief valve also comprises an adapter having interior threads, where the adapter is attached to the housing such that the adapter is positioned at least partially within the housing. The pressure relief valve also comprises an orifice plate having an orifice formed therein to allow fluid flow therethrough, where the orifice plate comprises exterior threads that engage with the interior threads of the adapter to couple the orifice plate to the adapter. The pressure relief valve also comprises a spring disposed within the housing. The orifice plate translates via engagement of the exterior threads with the interior threads to calibrate a spring force of the spring.

In another example, a method of assembling a pressure relief valve having a housing with an orifice plate and an adapter is described, where the housing includes a spring positioned with respect to the orifice plate and the adapter. The method comprises coupling the orifice plate to the adapter by engaging exterior threads of the orifice plate with interior threads of the adapter. The method also comprises attaching the adapter to the housing such that the adapter is positioned at least partially within the housing. The method also comprises calibrating a spring force of the spring by translating the orifice plate with respect to the adapter via engagement of the exterior threads with the interior thread.

In another example, a method of calibrating a pressure relief valve having a housing with an orifice plate and an adapter is described, where the housing includes a spring positioned with respect to the orifice plate and the adapter, and where the orifice plate comprises exterior threads that engage with interior threads of the adapter to couple the orifice plate to the adapter. The method comprises inserting a tool through the adapter. The method also comprises translating, using the tool and via engagement of the exterior threads with the interior threads, the orifice plate to calibrate a spring force of the spring.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

The present disclosure describes an improved pressure relief valve with an integrated calibration mechanism. Within examples, the disclosed pressure relief valve includes a housing, an adapter attached to the housing such that the adapter is positioned at least partially within the housing, and an orifice plate having exterior threads that engage with interior threads of the adapter to couple the orifice plate to the adapter. The orifice plate translates via engagement of the exterior threads with the interior threads to calibrate a spring force of a spring disposed within a cavity between a poppet and the orifice place. For example, a tool accesses the orifice plate via a sleeve of the adapter, and engages with the orifice plate to facilitate rotation and translation of the orifice plate. After the spring force has been calibrated, a restrictor is disposed within the sleeve of the adapter (e.g., such that the restrictor abuts a sleeve shoulder of the sleeve and is held in the adapter via an interference fit). The restrictor has at least one channel therewithin to allow fluid flow therethrough, and more particularly to dampen the fluid flow and facilitate a drop in pressure.

Thus, the disclosed pressure relief valve is an advantageous alternative to existing pressure relief valves that require trial and error shimming methods to calibrate spring force. By having an integrated calibration mechanism, such as the orifice plate that is threadedly engaged with the adapter, the spring force of the disclosed pressure relief valve can be more quickly calibrated to a desired force, and with less parts than existing pressure relief valves. In addition, the disclosed pressure relief valve does not need to be disassembled and reassembled in a manner akin to existing pressure relief valves. Furthermore, the rotation of the orifice plate can be a finer, more precise way of achieving a desired spring force calibration than adding and removing shims, which can have limited dimensional variation.

These and other improvements are described in more detail below. Implementations described below are for purposes of example. The implementations described below, as well as other implementations, may provide other improvements as well.

Figure 1:
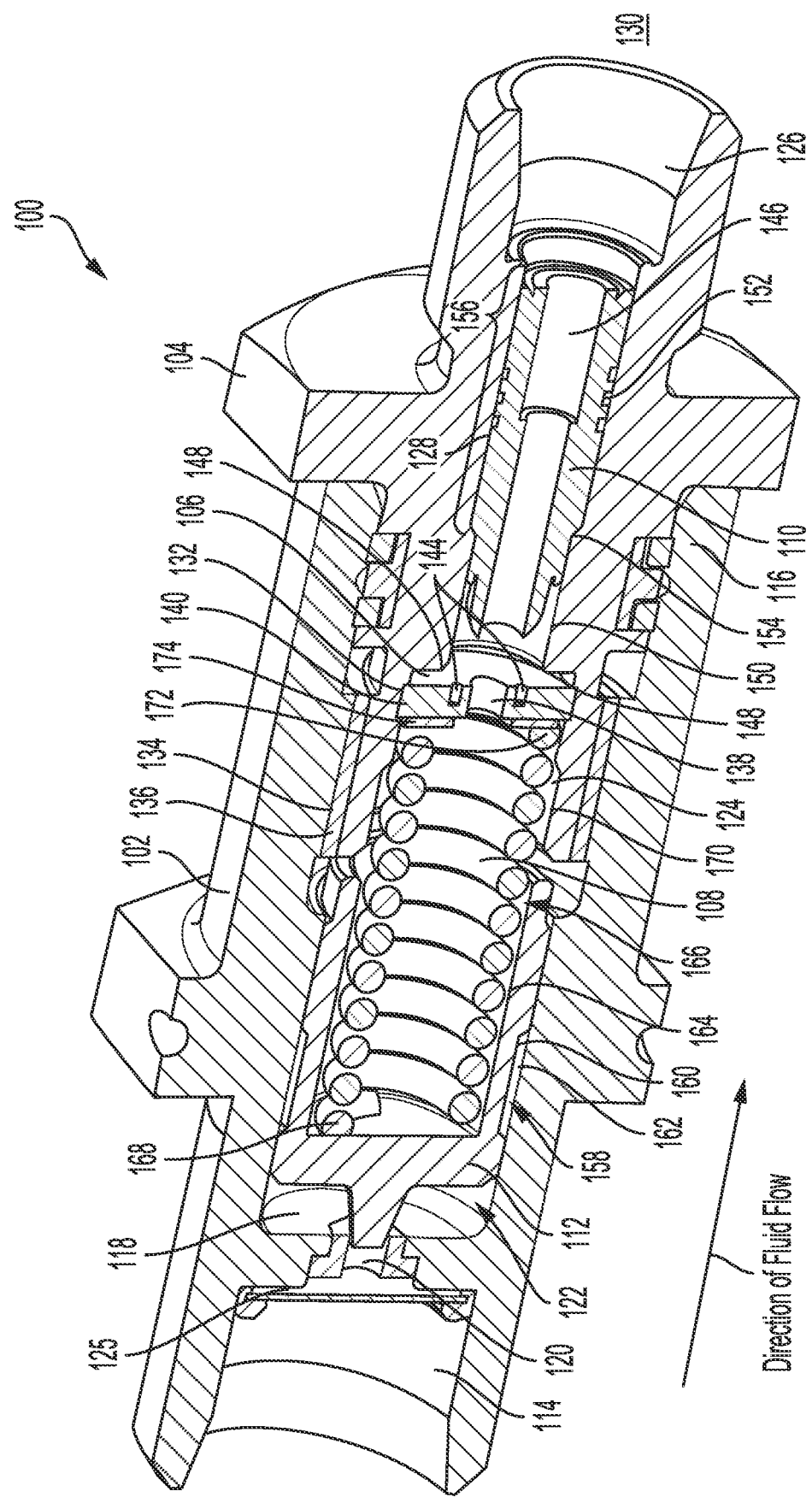
FIG. 1 depicts a pressure relief valve, according to an example implementation.

Referring now to the figures, FIG. 1 depicts a cutaway perspective view of an example of a pressure relief valve 100. The pressure relief valve 100 has a housing 102, an adapter 104, an orifice plate 106, and a spring 108 positioned with respect to the orifice plate 106 and the adapter 104. The pressure relief valve 100 shown in FIG. 1 also includes a restrictor 110 and a poppet 112. FIG. 1 also depicts an arrow showing a direction of fluid flow through the pressure relief valve 100. One or more of the housing 102, adapter 104, orifice plate 106, or spring 108 can be made of corrosion resistant steel, other types of metals, or other materials.

The housing 102 is configured to allow fluid flow therethrough and has a housing inlet 114 and a housing outlet 116. The housing inlet 114 has an orifice seat 118 having an orifice 120 formed therein to allow fluid flow therethrough. The housing 102 defines a cavity 122 between the orifice seat 118 and the housing outlet 116. The spring 108 is disposed within the housing 102—namely, within the cavity 122. In addition, the housing 102 includes a strainer 125 disposed within the housing inlet 114 proximate to, and upstream from, the orifice seat 118.

The adapter 104 has an adapter inlet 124, an adapter outlet 126, and a sleeve 128 that connects the adapter inlet 124 to the adapter outlet 126. The adapter 104 fluidly couples the cavity 122 of the housing 102 to an exterior 130 of the pressure relief valve 100. Further, an interior surface of the adapter inlet 126 has interior threads 132.

As further shown, the housing 102 also includes internal threads 134 and the adapter 104 also includes external threads 136. The adapter 104 is attached to the housing 102 via engagement of the internal threads 134 with the external threads 136. Further, the adapter 104 is attached to the housing 102 such that the adapter 104 is positioned at least partially within the housing 102. As shown, for instance, the adapter 104 is attached to the housing outlet 116 such that at least the adapter inlet 124 of the adapter 104 is positioned within the cavity 122 of the housing 102. In alternative examples, the adapter 104 can be attached to the housing 102 in other manners.

The orifice plate 106 has an orifice 138 formed therein to allow fluid flow therethrough. An exterior surface of the orifice plate 106 has exterior threads 140 that engage with the interior threads 132 of the adapter 104 (e.g., the interior threads 132 of the adapter inlet 124, as shown) to couple the orifice plate 106 to the adapter 104. Thus, the orifice plate 106 is rotatable, and the engagement of the exterior threads 140 with the interior threads 132 translates the orifice plate 106 to calibrate (e.g., adjust) a spring force of the spring 108 to a desired spring force.

Within examples, the orifice plate 106 also includes at least one blind-hole 144, a pair of which are shown in FIG. 1. The at least one blind-hole 144 is accessed via the adapter 104—namely, via insertion of a tool (not shown) into the adapter outlet 126 and through the sleeve 128 until the tool engages with the at least one blind-hole 144. For example, the tool includes one or more pins or other protrusions that are inserted into the at least one blind-hole 144 and facilitate continued engagement with the orifice plate 106 while the tool is rotated, thereby rotating and translating the orifice plate 106 to calibrate the spring force of the spring 108. Other tools, techniques, and/or configurations of the orifice plate 106 are possible as well to facilitate rotation and translation of the orifice plate 106.

Within examples, the orifice plate 106 is integrated with the adapter 104 such that the orifice plate 106 is coupled to the adapter 104 before the adapter 104 is attached to the housing 102. Within alternative examples, the adapter 104 is attached to the housing 102 and the orifice plate 106 is then coupled to the adapter 104 via engagement of the exterior threads 140 with the interior threads 132.

As further shown in FIG. 1, the restrictor 110 is disposed within the sleeve 128 of the adapter 104 and has at least one channel 146 therewithin to allow fluid flow therethrough (i.e., from the cavity 122 to the exterior 130 of the pressure relief valve 100). The at least one channel 146 is/are configured to dampen fluid flow and allow pressure to drop.

In addition, the adapter 104 includes a shoulder 148 that transitions the adapter inlet 124 to the sleeve 128. The sleeve 128 is a stepped sleeve having a first section 150 adjacent to the adapter inlet 124, a second section 152 adjacent to the adapter outlet 126, and a sleeve shoulder 154 that transitions the first section 150 to the second section 152. As shown, the internal diameter of the first section 150 is smaller than the internal diameter of the second section 152.

Within examples, the restrictor 110 is coupled to the adapter 104 by a press fit, particularly where a portion 156 of the restrictor 110 having a larger diameter than other portions of the restrictor 110 is held within the sleeve 128 and the restrictor is disposed within the second section 152 of the sleeve 128 such that the portion 156 of the restrictor 110 abuts the sleeve shoulder 154. Alternative techniques for coupling the restrictor 110 to the adapter 104 are also possible, such as a snap fit.

As further shown in FIG. 1, the poppet 112 is disposed within the cavity 122 as well, and the spring 108 biases the poppet 112 against the orifice seat 118, so as to restrict fluid flow through the orifice 120. The poppet 112 being disposed within the housing 102 defines a chamber 158 between an exterior surface 160 of the poppet 112 and an interior surface 162 of the housing 102. Further, the poppet 112 defines a first portion 164 of a spring chamber 166 that houses a proximal end 168 of the spring 108, and the adapter inlet 124 defines a second portion 170 of the spring chamber 166 that houses a distal end 172 of the spring 108. The chamber 158 is fluidly coupled to the spring chamber 166 and the orifice 138 of the orifice plate 106 fluidly couples the spring chamber 166 to the sleeve 128—or, more particularly, couples the spring chamber 166 to the restrictor 110 that is disposed in the sleeve 128.

As so arranged, the pressure relief valve 100 is configured to allow fluid flow therethrough such that fluid flows, in order, into the housing inlet 114, through the orifice 120 of the orifice seat 118, into the chamber 158, into the spring chamber 166, through the orifice 138 of the orifice plate 106, through the at least one channel 146 of the restrictor 110, and out of the adapter outlet 126.

The pressure relief valve 100 can optionally include other components that help provide thread retention and restrict movement of the orifice plate 106. An example of such a component is shown in FIG. 1, and two other examples are shown in FIG. 2.

As shown in FIG. 1, the pressure relief valve 100 includes a spring seat 174 disposed between the distal end 172 of the spring 108 and the orifice plate 106 such that the distal end 172 of the spring abuts the spring seat 174 and the spring seat 174 abuts the orifice plate 106.

Figure 2:
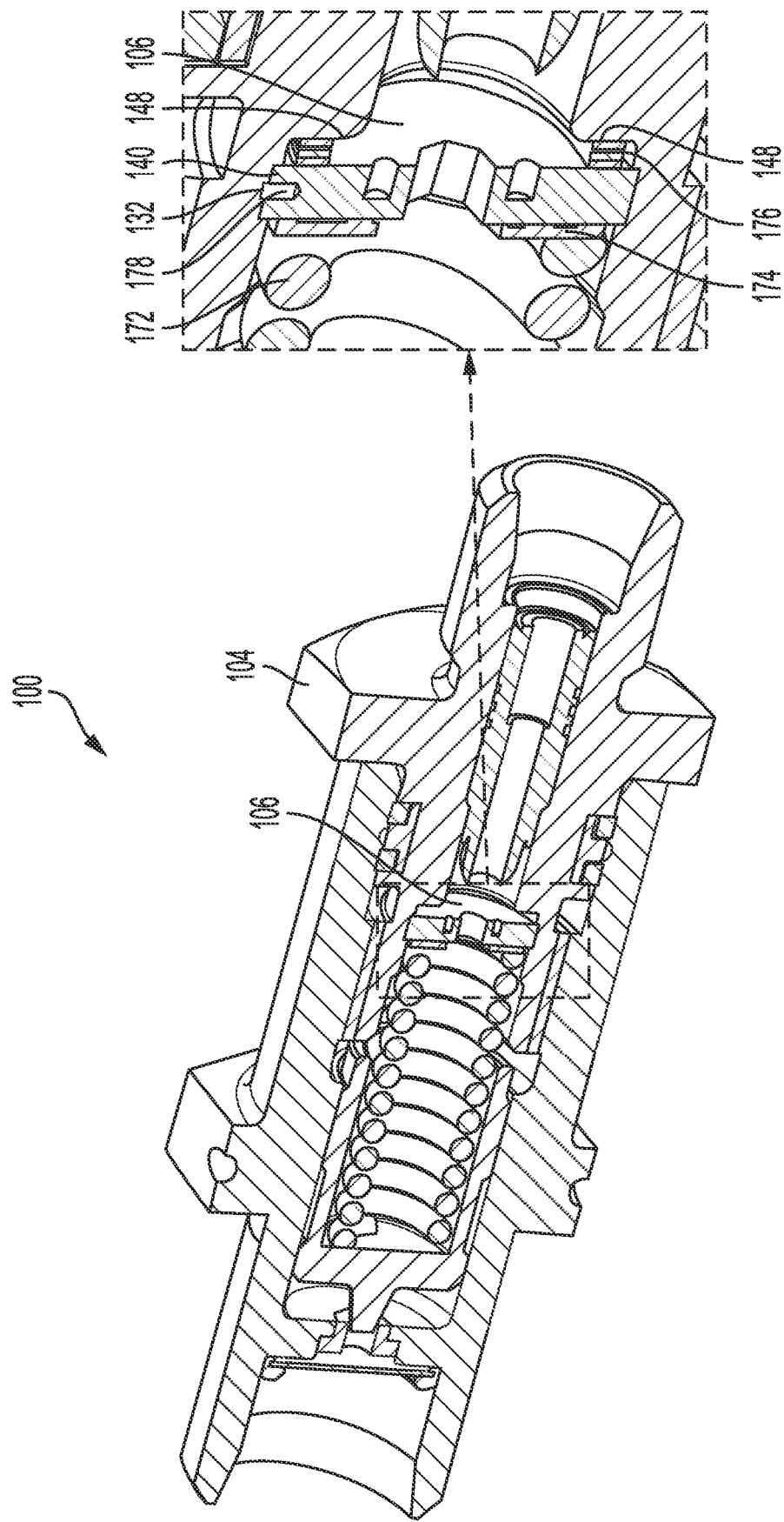
FIG. 2 depicts the pressure relief valve of FIG. 1 having additional components, according to an example implementation.

FIG. 2 next depicts the pressure relief valve 100 having a spring washer 176 and a polymer patch 178. In particular, the left side of FIG. 2 depicts the pressure relief valve 100 and the right side of FIG. 2 depicts a zoomed-in view of a specific area of the pressure relief valve 100 that includes the spring washer 176 and the polymer patch 178. The spring washer 176 is disposed between the orifice plate 106 and the shoulder 148. The polymer patch 178 is radially integrated with the exterior threads 140 and configured to deform and restrict thread movement when the exterior threads 140 engage with the interior threads 132, thereby helping prevent undesired translation of the orifice plate 106. Within examples, the polymer patch 178 is bonded to the exterior threads 140 of the orifice plate 106 before the orifice plate 106 is coupled to the adapter 104.

Figure 3:
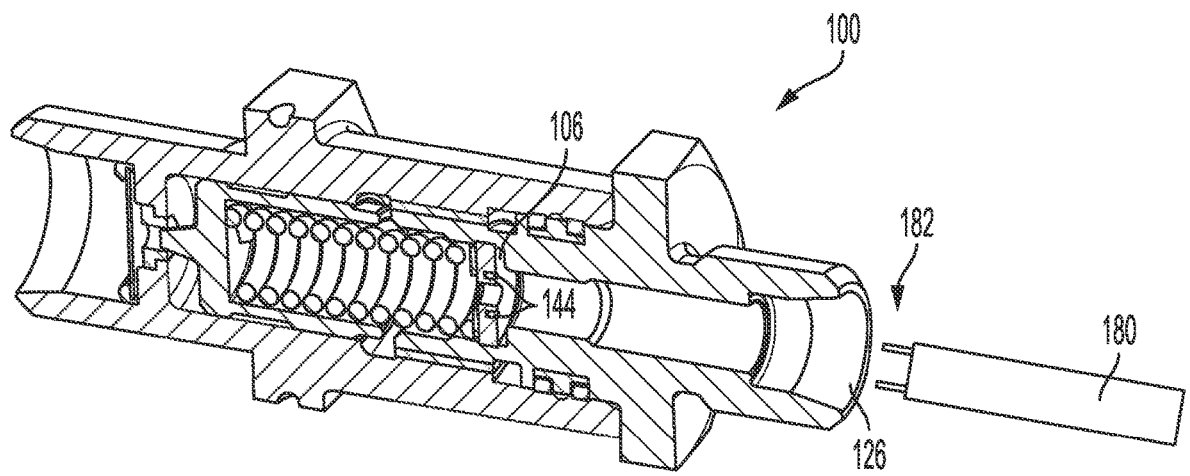
FIG. 3 depicts a stage in a process for calibrating the pressure relief valve of FIG. 1, according to an example implementation.

FIG. 3 next depicts the pressure relief valve 100 before the restrictor 110 (not shown) is inserted. As discussed above, to calibrate the spring force, a tool 180 is inserted into the adapter outlet 126 and engages the orifice plate 106, after which the tool 180 can be rotated, thereby rotating and translating the orifice plate 106. More particularly, the tool 180 includes pins 182 that are inserted into the at least one blind-hole 144, and the pins 182 facilitate continued engagement with the orifice plate 106 while the tool 180 is rotated, thereby rotating and translating the orifice plate 106 to calibrate the spring force of the spring 108.

Figure 4:
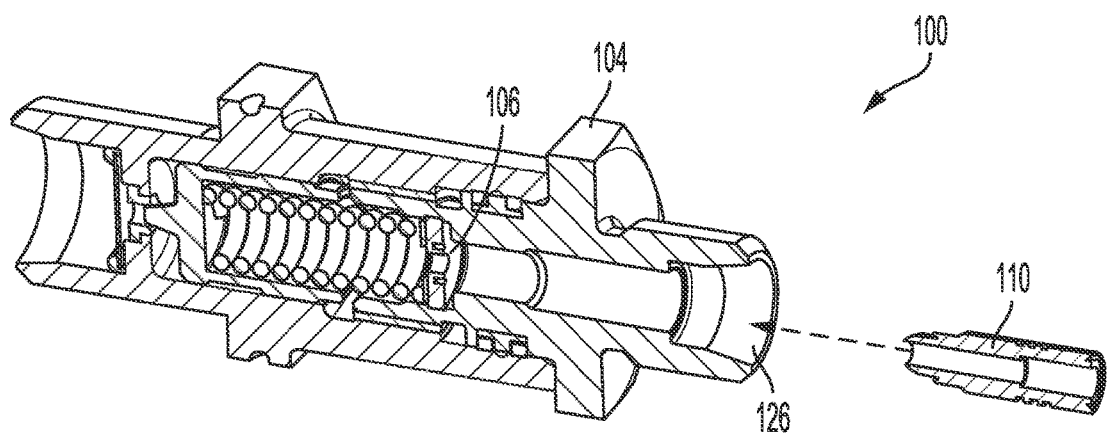
FIG. 4 depicts another stage in the process for calibrating the pressure relief valve of FIG. 1, according to an example implementation.

FIG. 4 depicts the pressure relief valve 110 as the restrictor 110 is inserted into the adapter outlet 126 until it reaches the position shown in FIGS. 1 and 2.

The design of the adapter 104 and the orientation of the restrictor 110 shown in FIGS. 1, 2, 3, and 4 advantageously allow the restrictor 110 to be inserted into the adapter 104 after the spring force is calibrated.

Figure 5:
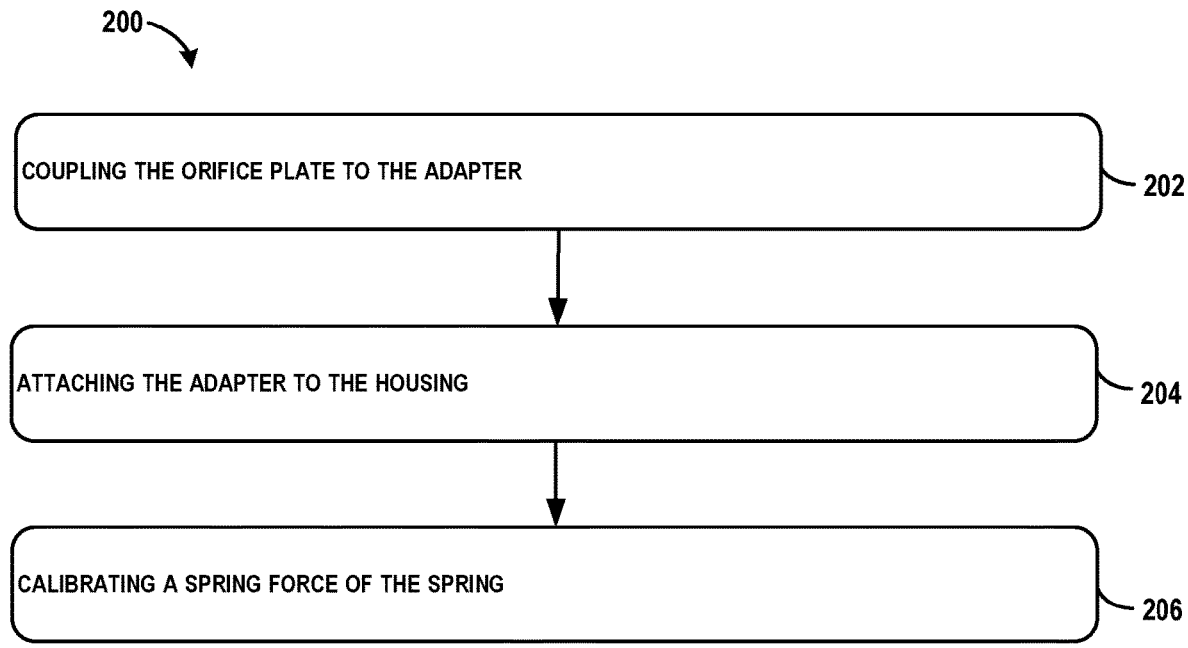
FIG. 5 shows a flowchart of an example method of assembling the pressure relief valve of FIG. 1, according to an example implementation.

FIG. 5 shows a flowchart of an example of a method 200 that could be used with the pressure relief valve 100 shown in FIGS. 1, 2, 3, and 4. Method 200 may include one or more operations, functions, or actions as illustrated by one or more of blocks 202-206.

At block 202, the method 200 includes coupling the orifice plate to the adapter. As described above, the orifice plate is coupled to the adapter by engaging exterior threads of the orifice plate with interior threads of the adapter.

At block 204, the method 200 includes attaching the adapter to the housing. As described above, the adapter is attached to the housing such that the adapter is positioned at least partially within the housing.

At block 206, the method 200 includes calibrating a spring force of the spring. As described above, the spring force of the spring is calibrated by translating the orifice plate with respect to the adapter via engagement of the exterior threads with the interior threads.

In some examples, the attaching shown in block 204 is performed after the coupling shown in block 202.

In some examples, the attaching shown in block 204 is performed before the calibrating shown in block 206. In other examples, the attaching shown in block 204 is performed after the calibrating shown in block 206.

The method 200 optionally includes positioning a spring seat between a distal end of the spring and the orifice plate such that the distal end of the spring abuts the spring seat and the spring seat abuts the orifice plate.

Within examples where the adapter comprises an adapter inlet, an adapter outlet, a sleeve that connects the adapter inlet to the adapter outlet, and a shoulder that transitions the adapter inlet to the sleeve, the method 200 optionally includes positioning a spring washer between the orifice plate and the shoulder. As described above, the spring washer is configured to restrict movement of the orifice plate.

Within additional examples where the adapter comprises an adapter inlet, an adapter outlet, a sleeve that connects the adapter inlet to the adapter outlet, and a shoulder that transitions the adapter inlet to the sleeve, the method 200 optionally includes radially integrating a polymer patch with the exterior threads. As described above, the polymer patch is configured to deform and restrict thread movement when the exterior threads engage with the interior threads.

The method 200 optionally includes after the calibrating, disposing a restrictor within the adapter. As described above, the restrictor comprises at least one channel therewithin to allow fluid flow therethrough.

Figure 6:
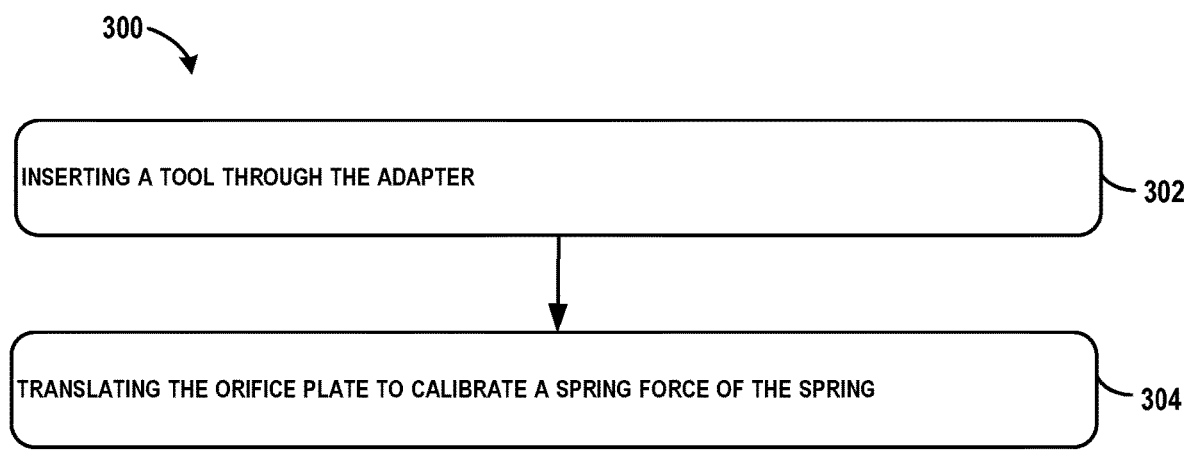
FIG. 6 shows a flowchart of an example method of calibrating the pressure relief valve of FIG. 1, according to an example implementation.

FIG. 6 shows a flowchart of an example of a method 300 that could be used with the pressure relief valve 100 shown in FIGS. 1, 2, 3, and 4. Method 300 may include one or more operations, functions, or actions as illustrated by one or more of blocks 302-304.

At block 302, the method 300 includes inserting a tool through the adapter.

At block 304, the method 300 includes translating the orifice plate to calibrate a spring force of the spring. As described above, the orifice plate is translated using the tool and via engagement of the exterior threads with the interior threads.

Within examples where the orifice plate includes at least one blind-hole, the inserting shown in block 302 optionally includes inserting the tool through the adapter to engage the tool with the at least one blind-hole.

The method 300 optionally includes after the translating, positioning a restrictor within the adapter. As described above, the restrictor includes at least one channel therewithin to allow fluid flow therethrough.

Devices or systems may be used or configured to perform logical functions presented in FIGS. 5 and 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 5 and 6 are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A pressure relief valve comprising:
    a housing configured to allow fluid flow therethrough;
    an adapter having interior threads, wherein the adapter is attached to the housing such that the adapter is positioned at least partially within the housing, wherein the adapter comprises an adapter inlet, an adapter outlet, a sleeve connecting the adapter inlet to the adapter outlet, and a shoulder that transitions the adapter inlet to the sleeve;
    an orifice plate having an orifice formed therein to allow fluid flow therethrough, wherein the orifice plate comprises exterior threads that engage with the interior threads of the adapter to couple the orifice plate to the adapter;
    a spring disposed within the housing, wherein the orifice plate translates via engagement of the exterior threads with the interior threads to calibrate a spring force of the spring; and
    a spring washer disposed between the orifice plate and the shoulder and configured to restrict movement of the orifice plate.

2. The pressure relief valve of claim 1, further comprising:
    a spring seat disposed between a distal end of the spring and the orifice plate such that the distal end of the spring abuts the spring seat and the spring seat abuts the orifice plate.

3. The pressure relief valve of claim 1, wherein the adapter comprises an adapter inlet, an adapter outlet, a sleeve that connects the adapter inlet to the adapter outlet, and a shoulder that transitions the adapter inlet to the sleeve, the pressure relief valve further comprising:
    a polymer patch radially integrated with the exterior threads and configured to deform and restrict thread movement when the exterior threads engage with the interior threads.

4. The pressure relief valve of claim 1, further comprising:
    a restrictor disposed within the adapter and comprising at least one channel therewithin to allow fluid flow therethrough.

5. The pressure relief valve of claim 4, wherein the adapter comprises an adapter inlet, an adapter outlet, a sleeve that connects the adapter inlet to the adapter outlet, and a shoulder that transitions the adapter inlet to the sleeve,
    wherein the sleeve is a stepped sleeve comprising a first section adjacent to the adapter inlet, a second section adjacent to the adapter outlet, and a sleeve shoulder that transitions the first section to the second section, and
    wherein the restrictor is disposed within the sleeve such that the restrictor abuts the sleeve shoulder.

6. The pressure relief valve of claim 1, wherein the orifice plate comprises at least one blind-hole accessible via the adapter, and
    wherein the at least one blind-hole is configured to receive a tool that, when rotated, rotates and translates the orifice plate to calibrate the spring force.

7. The pressure relief valve of claim 1, wherein the orifice plate is integrated with the adapter such that the orifice plate is coupled to the adapter before the adapter is attached to the housing.

8. The pressure relief valve of claim 1, further comprising:
    a poppet disposed within the housing,
    wherein a housing inlet of the housing comprises an orifice seat having an orifice formed therein to allow fluid flow therethrough, and
    wherein the spring biases the poppet against the orifice seat.

9. The pressure relief valve of claim 8, wherein the adapter comprises an adapter inlet, an adapter outlet, and a sleeve that connects the adapter inlet to the adapter outlet,
    wherein the poppet being disposed within the housing defines a chamber between an exterior surface of the poppet and an interior surface of the housing,
    wherein the poppet defines a first portion of a spring chamber that houses a proximal end of the spring,
    wherein the adapter inlet defines a second portion of the spring chamber that houses a distal end of the spring, wherein the chamber is fluidly coupled to the spring chamber, and wherein the orifice of the orifice plate fluidly couples the spring chamber to the sleeve.

10. The pressure relief valve of claim 9, further comprising:

a restrictor disposed within the adapter and comprising at least one channel therewithin to allow fluid flow therethrough, wherein the pressure relief valve is configured to allow fluid flow therethrough such that fluid flows, in order, into the housing inlet, through the orifice of the orifice seat, into the chamber, into the spring chamber, through the orifice of the orifice plate, through the at least one channel of the restrictor, and out of the adapter outlet.

11. The pressure relief valve of claim 1, further comprising:

a restrictor coupled to the adapter by a press fit.

12. The pressure relief valve of claim 1, wherein the orifice plate comprises at least one blind-hole accessible via the adapter, and wherein the at least one blind-hole is configured to receive a tool having one or more pins.

13. The pressure relief valve of claim 1, further comprising:

a restrictor coupled to the adapter by a press fit.

14. A method of assembling a pressure relief valve having a housing with an orifice plate and an adapter, wherein the housing includes a spring positioned with respect to the orifice plate and the adapter, the method comprising:

coupling the orifice plate to the adapter by engaging exterior threads of the orifice plate with interior threads of the adapter, wherein the adapter comprises an adapter inlet, an adapter outlet, a sleeve connecting the adapter inlet to the adapter outlet, and a shoulder that transitions the adapter inlet to the sleeve;

attaching the adapter to the housing such that the adapter is positioned at least partially within the housing positioning a spring washer between the orifice plate and the shoulder, wherein the spring washer is configured to restrict movement of the orifice plate; and calibrating a spring force of the spring by translating the orifice plate with respect to the adapter via engagement of the exterior threads with the interior threads.

15. The method of claim 14, wherein the attaching is performed after the coupling.

16. The method of claim 14, further comprising:

positioning a spring seat between a distal end of the spring and the orifice plate such that the distal end of the spring abuts the spring seat and the spring seat abuts the orifice plate.

17. The method of claim 14, wherein the adapter comprises an adapter inlet, an adapter outlet, a sleeve that connects the adapter inlet to the adapter outlet, and a shoulder that transitions the adapter inlet to the sleeve, the method further comprising:

radially integrating a polymer patch with the exterior threads, wherein the polymer patch is configured to deform and restrict thread movement when the exterior threads engage with the interior threads.

18. The method of claim 14, further comprising:

after the calibrating, disposing a restrictor within the adapter, wherein the restrictor comprises at least one channel therewithin to allow fluid flow therethrough.

19. The method of claim 14, further comprising:

coupling a restrictor to the adapter via a press fit.

20. The method of claim 14, wherein calibrating the spring force of the spring by translating the orifice plate with respect to the adapter comprises:

inserting a tool through the adapter such that the tool engages the orifice plate; and rotating the tool to translate the orifice plate with respect to the adapter.

* * * * *